United States Patent
Ponnappan et al.

(10) Patent No.: US 11,558,243 B2
(45) Date of Patent: Jan. 17, 2023

(54) PROACTIVE ERROR CAPTURE

(71) Applicant: ARRIS Enterprises LLC, Suwanee, GA (US)

(72) Inventors: Renjith Kumar Ponnappan, Fremont, CA (US); Sanjeev Nand Chhabria, Fremont, CA (US); Rubasri Pandian, Chennai (IN); Sophronia Alexander, Chennai (IN); Thamaraiselvan Gajendran, Bengaluru (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/120,464

(22) Filed: Dec. 14, 2020

(65) Prior Publication Data

US 2021/0208963 A1    Jul. 8, 2021

Related U.S. Application Data

(60) Provisional application No. 62/958,677, filed on Jan. 8, 2020.

(51) Int. Cl.
*H04L 41/069* (2022.01)
*G06F 11/30* (2006.01)

(52) U.S. Cl.
CPC ........ *H04L 41/069* (2013.01); *G06F 11/3072* (2013.01)

(58) Field of Classification Search
CPC ............. G06F 11/0766; G06F 11/0778; G06F 11/0784; G06F 11/0787; G06F 11/3072; G06F 11/3466; G06F 11/3476; G06F 11/3495; G06F 11/3636; H04L 41/069
See application file for complete search history.

(56) References Cited

U.S. PATENT DOCUMENTS

| | | | |
|---|---|---|---|
| 6,618,775 B1 * | 9/2003 | Davis | G06F 11/3466 714/E11.215 |
| 6,880,113 B2 * | 4/2005 | Anderson | G06F 11/0778 714/45 |

(Continued)

FOREIGN PATENT DOCUMENTS

WO    WO2013105790 A1 *   7/2013   ......... H04L 43/0847

*Primary Examiner* — Gabriel Chu
(74) *Attorney, Agent, or Firm* — Steven Stupp; Stewart Wiener

(57) ABSTRACT

During operation, an electronic device may store, in memory, information associated with operation of the electronic device, such as during communication and processing of one or more packets or frames. Furthermore, an error-event monitor in the electronic device may, during a time interval, analyze at least a portion of the stored information to detect an occurrence of an error event in one or more types of error events in the electronic device. When the error event occurs during the time interval, the electronic device may perform a remedial action and may persist, in the memory, at least a second portion of the stored information associated with the error event. Otherwise, when the error event does not occur during the time interval, the electronic device may overwrite, in the memory, the stored information with additional information associated with operation of the electronic device during subsequent communicating and processing.

22 Claims, 6 Drawing Sheets

(56) References Cited

U.S. PATENT DOCUMENTS

| | | | | |
|---|---|---|---|---|
| 7,464,301 | B1* | 12/2008 | Entezari | G06F 11/3476 714/45 |
| 11,204,821 | B1* | 12/2021 | Gopalakrishnan | G06F 11/0772 |
| 2008/0244327 | A1* | 10/2008 | Coombes | G06F 11/348 714/45 |
| 2011/0270957 | A1* | 11/2011 | Phan | H04L 41/0622 709/224 |
| 2012/0113822 | A1* | 5/2012 | Letner | H04L 41/069 370/250 |
| 2012/0297254 | A1* | 11/2012 | Shazly | G06F 11/3476 714/45 |
| 2013/0179732 | A1* | 7/2013 | Alanis | G06F 11/22 714/E11.147 |
| 2013/0185601 | A1* | 7/2013 | Mayer | G06F 11/3636 714/45 |
| 2015/0242293 | A1* | 8/2015 | Segger | G06F 11/2294 714/33 |

* cited by examiner

PROACTIVE ERROR CAPTURE

CROSS REFERENCE TO RELATED APPLICATIONS

This application claims priority under 35 U.S.C. 119(e) to U.S. Provisional Application Ser. No. 62/958,677, entitled "Proactive Error Capture," by Renjith Kumar Ponnappan, Sanjeev Nand Chhabria, Rubasri Pandian, and Sophronia Alexander, filed on Jan. 8, 2020, the contents of which are herein incorporated by reference.

BACKGROUND

Field

The described embodiments relate to techniques for automatically capturing and storing information for an error event as the error event occurs, and persisting the stored error-event information for subsequent remedial action.

Related Art

In existing systems, trouble shooting of errors is typically performed after the fact. For example, after an error is reported, attempts may be made to reproduce the error and to collect information for use in debugging the error.

However, it can be difficult to reproduce an error afterwards or retrospectively. This is especially the case for intermittent errors. Moreover, even when an error can be reproduced, it may occur infrequently. Consequently, retrospective troubleshooting can be time-consuming and expensive.

SUMMARY

An electronic device is described. The electronic device selectively and automatically captures error-event information. The electronic device may include: an interface circuit, memory that store program instructions, and a processor that executes the program instructions. During operation, the electronic device may communicate one or more packets or frames using the interface circuit, and may process the one or more packets or frames (or contents of the one or more packets or frames) using the processor. Moreover, the electronic device may store, in the memory, information associated with operation of the electronic device during the communicating and processing. Furthermore, an error-event monitor in the electronic device may, during a time interval, analyze at least a portion of the stored information (and optionally additional or other information) to detect an occurrence of an error event in one or more types of error events in the electronic device. When the error event occurs during the time interval, the electronic device may perform a remedial action and may persist, in the memory, at least a second portion of the stored information associated with the error event. Otherwise, when the error event does not occur during the time interval, the electronic device may overwrite, in the memory, the stored information with additional information associated with operation of the electronic device during subsequent communicating and processing.

Note that the electronic device may include a router or a switch.

Moreover, the stored information may include: state information for the interface circuit, state information for the processor, and/or information associated with the one or more packets or frames.

Furthermore, when the error event occurs, the error-event monitor may increment a stored statistic for an associated type of error event. Additionally, when the error event occurs, the error-event monitor may store timestamp information in the memory.

In some embodiments, the error-event monitor may be implemented as error-event program instructions executed by the processor. Alternatively or additionally, the error-event monitor may be implemented using a circuit.

Moreover, the remedial action may include providing a notification message to a computer (such as a remotely located computer or a cloud-based computer).

Furthermore, in response to the notification, the electronic device may receive, from a second computer (which may be the computer or may be a different computer), a request for the stored information associated with the error event. In response, the electronic device may provide, to the second computer, the stored information associated with the error event.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
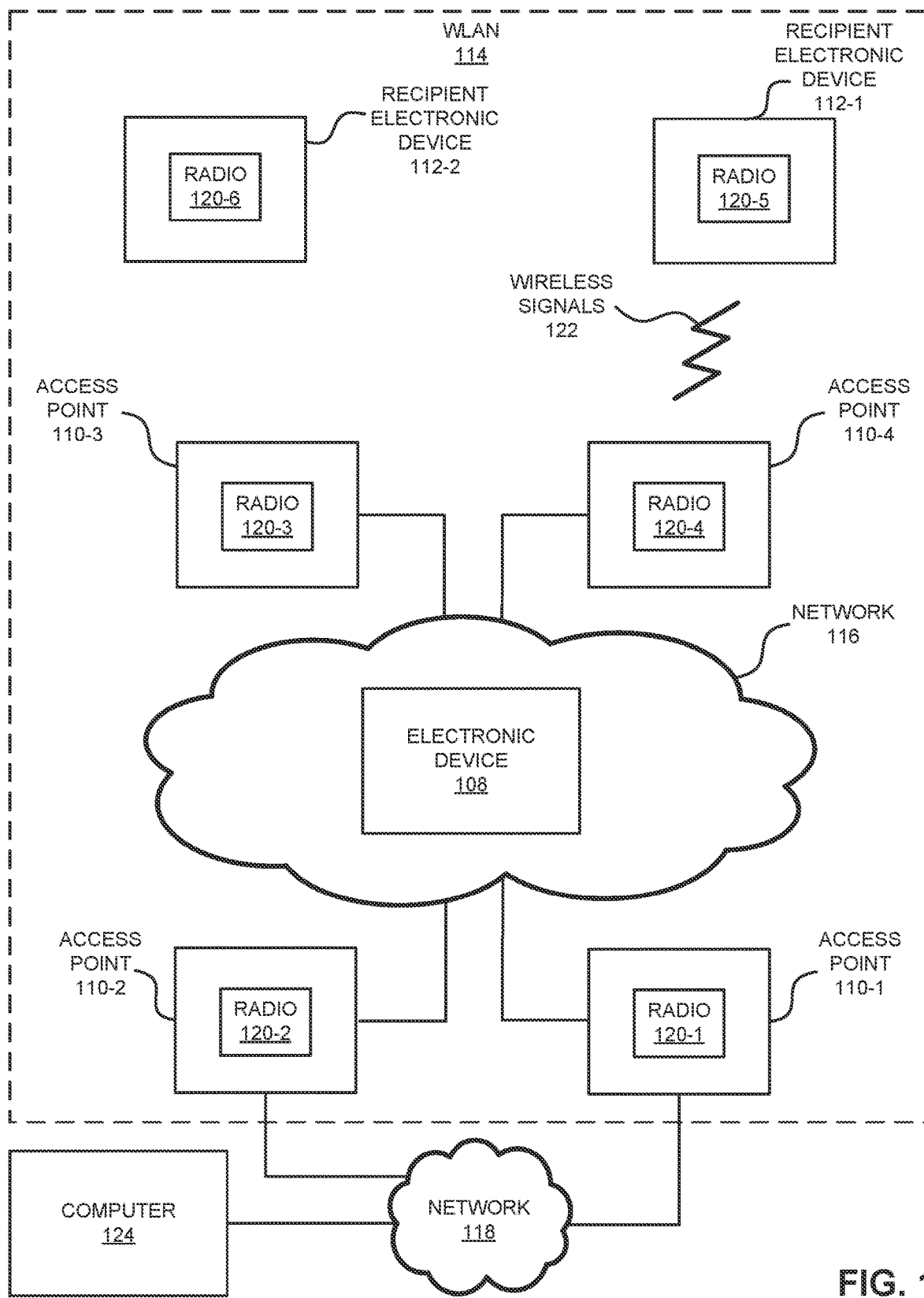
FIG. 1 is a block diagram illustrating an example of communication among access points and electronic devices in a wireless network in accordance with an embodiment of the present disclosure.

An electronic device is described. The electronic device includes: an interface circuit, memory, and a processor. During operation, the electronic device may communicate one or more packets or frames using the interface circuit, and may process the one or more packets or frames (or contents of the one or more packets or frames) using the processor. Moreover, the electronic device may store, in the memory, information associated with operation of the electronic device during the communicating and processing. Furthermore, an error-event monitor in the electronic device may, during a time interval, analyze at least a portion of the stored information (and optionally additional or other information) to detect an occurrence of an error event in one or more types of error events in the electronic device. When the error event occurs during the time interval, the electronic device may perform a remedial action and may persist, in the memory, at least a second portion of the stored information associated with the error event. Otherwise, when the error event does not occur during the time interval, the electronic device may overwrite, in the memory, the stored information with additional information associated with operation of the electronic device during subsequent communicating and processing.

By selectively and automatically capturing error-event information during operation of the electronic device, these monitoring techniques may provide proactive capture of the error event. This capability may eliminate a need to subsequently reproduce the error event. Consequently, the monitoring techniques may accelerate debugging and correction of the error event. Therefore, the monitoring techniques may reduce the time and cost associated with error analysis and debugging of the electronic device.

In some embodiments, the electronic device may be used in conjunction with other electronic devices in a wireless network (such as an access point or recipient electronic devices, which are sometimes referred to as 'clients'), which may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Washington), and/or another type of wireless interface. In the discussion that follows, Wi-Fi is used as an illustrative example. However, a wide variety of communication protocols (such as Long Term Evolution or LTE, another cellular-telephone communication protocol, etc.) may be used. The wireless communication may occur in a 2.4 GHz, a 5 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.')

Moreover, the electronic device and/or the access point may communicate with one or more other access points and/or computers in the WLAN using a wireless or a wired communication protocol. Alternatively or additionally, the electronic device may communicate with other electronic devices (such as computers or servers) using the wired communication protocol. Note that the wired communication protocol may include an IEEE 802.3 standard (which is sometimes referred to as 'Ethernet') and/or another type of wired or wireless interface. In the discussion that follows, Ethernet is used as an illustrative example of the wired communication protocol.

FIG. 1 presents a block diagram illustrating an example of communication among one or more access points 110 and recipient electronic devices 112 (such as a cellular telephone, and which are sometimes referred to as 'clients') in a WLAN 114 in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with recipient electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches. For example, WLAN 114 may include an electronic device 108, such as a switch and/or a router. Note that electronic device 108 may communicate with access points 110 using wired communication and/or optional wireless communication (e.g., via one of access points 110 that is connected to electronic device 108).

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication within WLAN 114 (such as Ethernet) and wireless communication within WLAN 114 (such as Wi-Fi), and one or more of access points 110 may also support a wired communication protocol for communicating via network 118 with other electronic devices (such as a computer or a controller of WLAN 114, which may be remotely located from WLAN 114).

Figure 7:
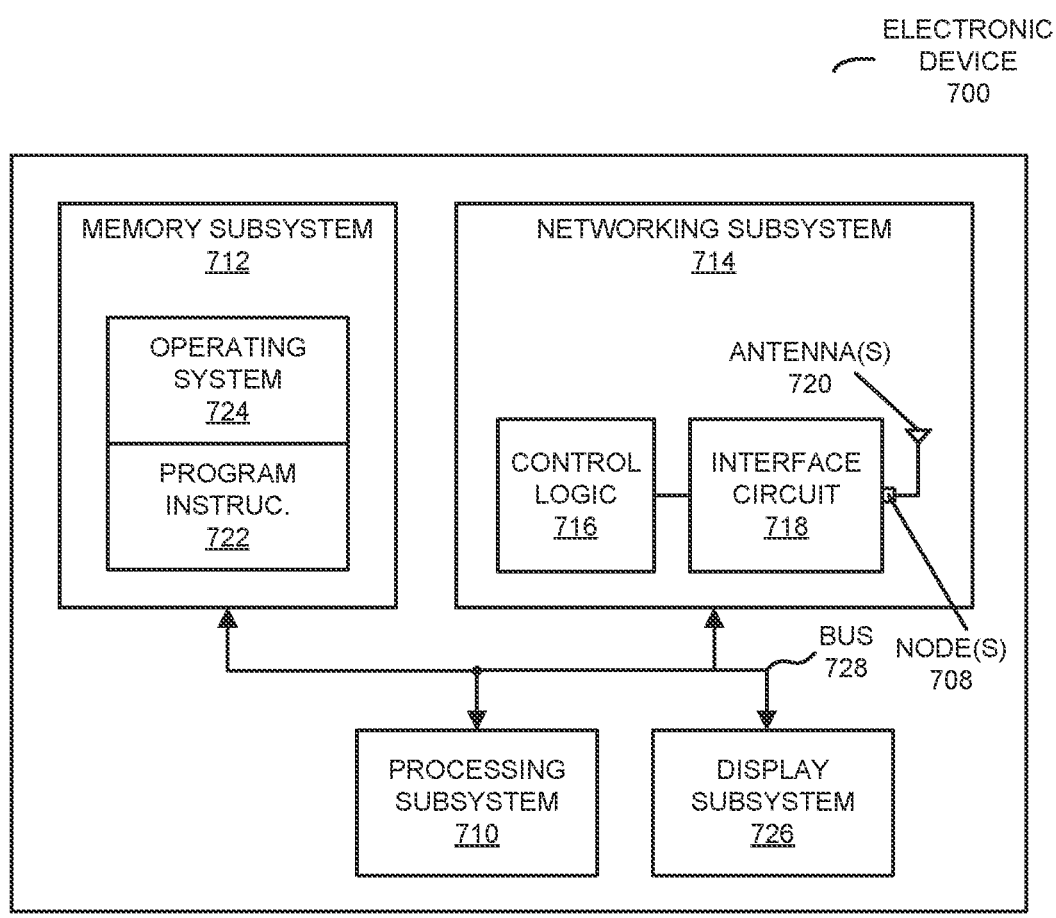
FIG. 7 is a block diagram illustrating an example of an electronic device in accordance with an embodiment of the present disclosure.

As described further below with reference to FIG. 7, electronic device 108, access points 110 and/or recipient electronic devices 112 may include subsystems, such as a networking subsystem, a memory subsystem and a processor subsystem. In addition, access points 110 and recipient electronic devices 112 may include radios 120 in the networking subsystems. More generally, access points 110 and recipient electronic devices 112 can include (or can be included within) any electronic devices with the networking subsystems that enable access points 110 and recipient electronic devices 112 to communicate with each other using wireless and/or wired communication. This wireless communication can comprise transmitting advertisements on wireless channels to enable access points 110 and/or recipient electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and recipient electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in recipient electronic device 112-1. Access point 110-4 may transmit packets or frames. In turn, these packets or frames may be received by recipient electronic device 112-1. Moreover, access point 110-4 may allow recipient electronic device 112-1 to communicate with other electronic devices, computers and/or servers via networks 116 and/or 118.

Note that the communication among access points 110 and/or with recipient electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a communication time interval (such as 1-10 s) to an estimated maximum number of bytes that can be communicated in the communication time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and recipient electronic devices 112 includes: receiving signals (such as wireless signals 122) with the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be time-consuming, expensive and/or difficult to retrospectively reproduce reported error events. As described further below with reference to FIGS. 2-6, in order to address this problem, electronic device 108 may selectively and automatically capture error-event information. Notably, electronic device 108 may store, in memory in or associated with electronic device 108, information associated with operation of electronic device 108, such as information associated with communicating and processing of one or more packets or frames. Then, an error-event monitor in electronic device 108 may, during a time interval (such as 0.5-10 s), analyze at least a portion of the stored information (and optionally additional or other information) to detect an occurrence of an error event in one or more types of error events in electronic device 108. Alternatively, in order to reduce a size or amount of memory used in the monitoring techniques, when the error event does not occur during the time interval, electronic device 108 may overwrite, in the memory, the stored information with additional information associated with operation of electronic device 108, such as the additional information associated with subsequent communicating and processing of one or more additional packets or frames.

When the error event occurs during the time interval, electronic device 108 may perform a remedial action and may persist, in the memory, at least a second portion of the stored information associated with the error event. For example, electronic device 108 may provide a notification message to a computer 124 (such as a cloud-based controller for electronic device 108).

In this way, error events in or associated with operation of electronic device 108 may allow debugging of the error events without requiring the error events to be subsequently reproduced. Therefore, the monitoring techniques may facilitate faster and cheaper debugging and/or correction of the error events.

Figure 2:
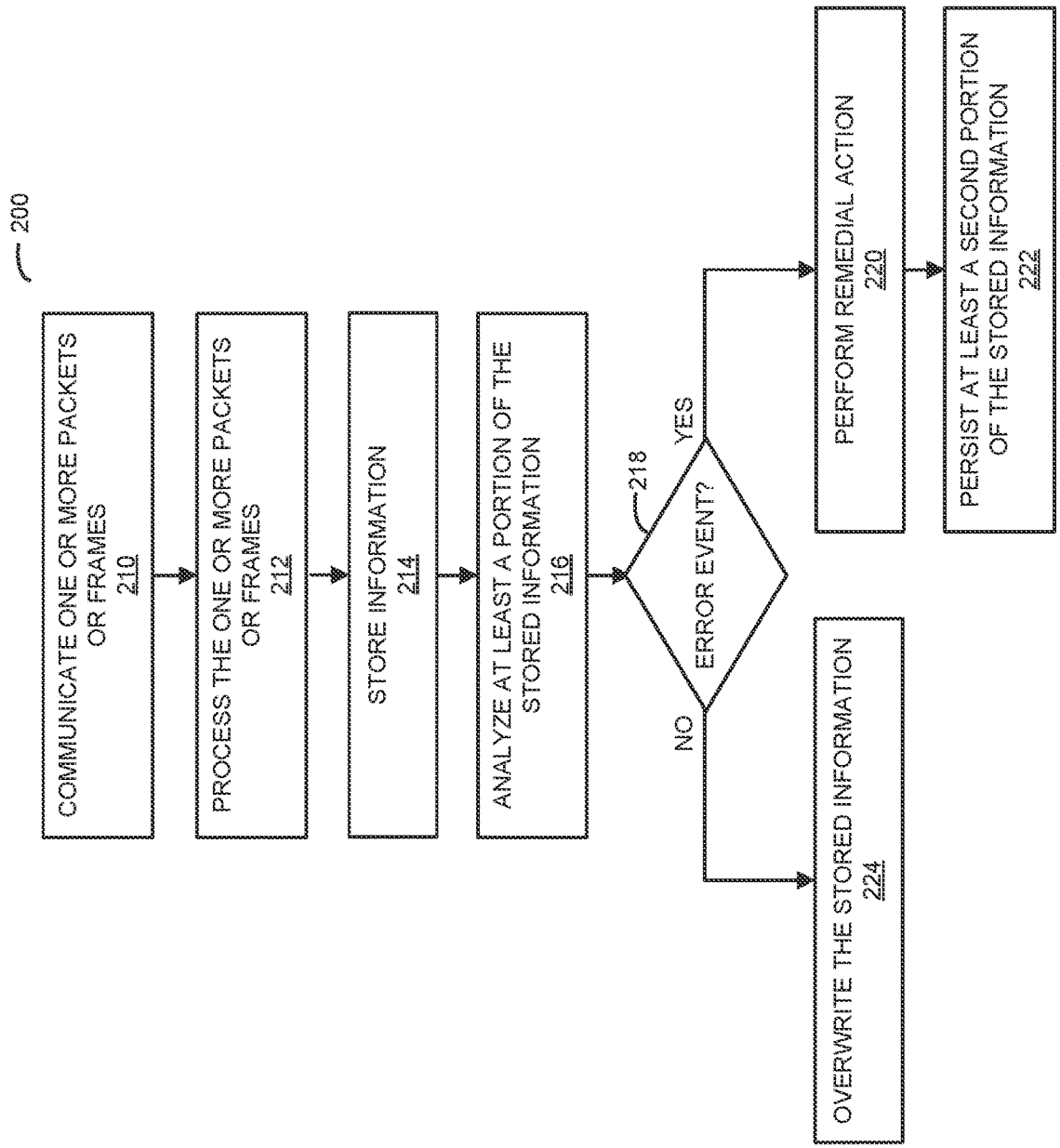
FIG. 2 is a flow diagram illustrating an example of a method for selectively and automatically capturing error-event information using an electronic device in FIG. 1 in accordance with an embodiment of the present disclosure.

We now describe embodiments of a method. FIG. 2 presents a flow diagram illustrating an example of a method 200 for selectively and automatically capturing of error-event information using an electronic device, such as electronic device 108 in FIG. 1.

During operation, an electronic device may optionally communicate one or more packets or frames (operation 210) using an interface circuit in the electronic device, and/or may optionally process the one or more packets or frames (operation 212), or contents of the one or more packets or frames, using a processor in the electronic device.

Moreover, the electronic device may store, in memory in or associated with the electronic device, information (operation 214) associated with operation of the electronic device during the communicating and processing. For example, the stored information may include: state information for the interface circuit, state information for the processor, and/or information associated with the one or more packets or frames. Note that the information may be collected and stored at runtime in the electronic device.

Furthermore, an error-event monitor in the electronic device may, during a time interval, analyze at least a portion of the stored information (operation 216) (and optionally additional or other information) to detect an occurrence of a given error event that is a given type of error event in one or more types of error events in the electronic device. This analysis may involve comparing one or more states of one or more components, modules or subsystems (such as register values, error messages, status indicators, performance metrics, etc.) in the electronic device to one or more predefined states or signatures associated with known or predefined types of errors. Alternatively or additionally, the analysis may involve comparing the one or more states of one or more components, modules or subsystems in the electronic device to a normal or expected operating range of the one or more states. Thus, in some embodiments, the detected error event may not have been previously reported. Note that the error-event monitor may have a central implementation (such as program instructions for the error-event monitor that are executed by a processor to analyze data collected from the one or more components, modules or subsystems in the electronic device) and/or a distributed implementation (e.g., the one or more components, modules or subsystems in the electronic device may each execute program instructions for the error-event monitor to analyze their respective collected data).

When the error event occurs (operation 218) during the time interval, the electronic device may perform a remedial action (operation 220) and may persist, in the memory, at least a second portion of the stored information (operation 222) associated with the error event. (Note that the portion of the stored information may: be the same as the second portion of the stored information, partially overlap the second portion of the stored information, or be different from the second portion of the stored information.) For example, the remedial action may include providing a notification message to a computer (such as a remotely located computer or a cloud-based computer). Otherwise, when the error event does not occur (operation 218) during the time interval, the electronic device may overwrite (or erase), in the memory, the stored information (operation 224) with additional information associated with operation of the electronic device during subsequent communicating and processing.

In some embodiments, the electronic device may optionally perform one or more additional operations. For example, when the error event occurs (operation 218), the error-event monitor may increment a stored statistic for an associated type of error event. Additionally, when the error event occurs (operation 218), the error-event monitor may store timestamp information in the memory.

Furthermore, the electronic device may receive, from a second computer (which may be the computer or may be a different computer), a request for the stored information associated with the error event. In response, the electronic device may provide, to the second computer, the stored information associated with the error event.

In some embodiments of method 200, there may be additional or fewer operations. Moreover, there may be different operations. Furthermore, the order of the operations may be changed, and/or two or more operations may be combined into a single operation.

Figure 3:
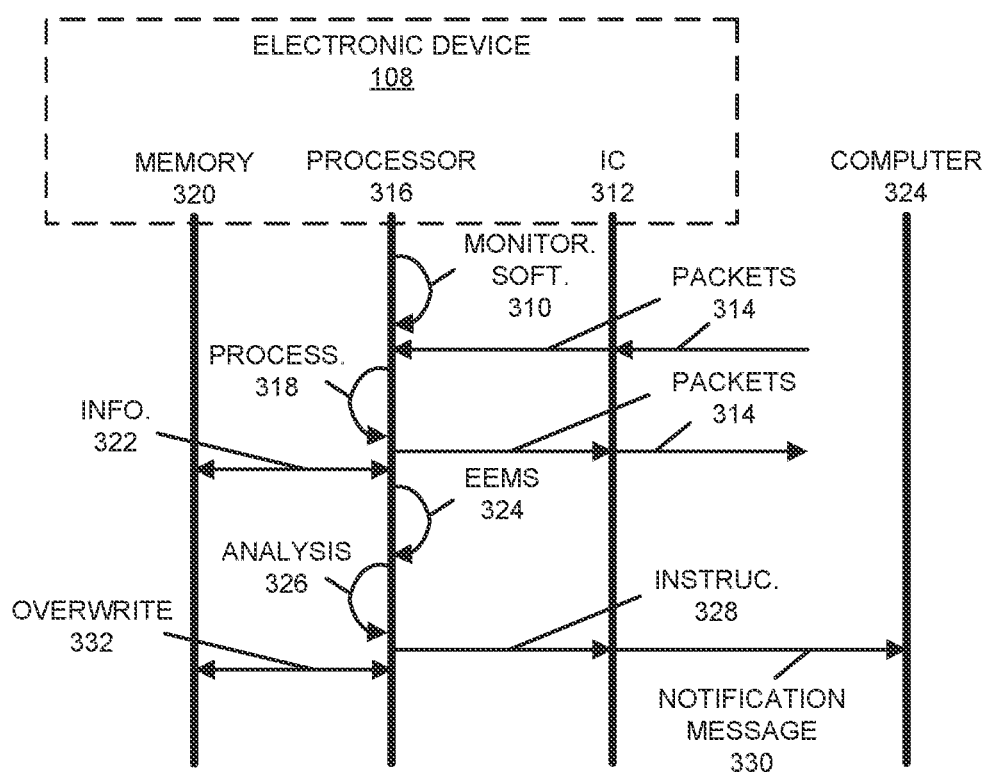
FIG. 3 is a drawing illustrating an example of communication among components in FIG. 1 in accordance with an embodiment of the present disclosure.

FIG. 3 presents a drawing illustrating an example of communication among components in electronic device 108 and computer 124. Notably, interface circuit (IC) 312 in electronic device 108 may communicate, using a wired communication protocol, one or more packets 314 or frames. Alternatively or additionally, processor 316 in electronic device 108 may process 318 the one or more packets 314 or frame or contents in the one or more packets 314 or frames.

Moreover, processor 316 may execute monitoring software 310 or program instructions. During execution of monitoring software 310, processor 316 may store, in memory 320 in electronic device 108, information 322 associated with operation of electronic device 108 during the wired communicating and processing 318 of the one or more packets 314.

Furthermore, processor 316 may execute error-event monitoring software (EEMS) 324 or program instructions. During execution of the error-event monitoring software 324, processor 316 may analyze 326 at least a portion of the stored information 322 (and optionally additional or other information) during a time interval in order to detect an occurrence of a given error event that is a given type of error event in one or more types of error events in electronic device 108.

When the error event occurs during the time interval, processor 316 may perform a remedial action and may persist, in memory 320, at least a second portion of the stored information 322 associated with the error event. For example, during the remedial action, processor 316 may instruct 328 interface circuit 312 to provide a notification message 330 about the error event to computer 124. Otherwise, when the error event does not occur during the time interval, processor 316 may overwrite 332, in memory 320, the stored information 322.

While FIG. 3 illustrates communication between components using unidirectional or bidirectional communication with lines having single arrows or double arrows, in general the communication in a given operation in these figures may involve unidirectional or bidirectional communication.

In some embodiments, a dynamic error-handling framework triggers automatic data collection when an error event occurs. These monitoring techniques may eliminate a need to retrospectively replicate the error event, and may reduce a time needed to correct the error event. Moreover, the monitoring techniques may reduce or eliminate manual data collection when the error event occurs.

Notably, during the monitoring techniques, a system may automatically collect debug information specific to the issue once the error event has occurred in the system. These debug logs may be stored to a file, which may be automatically uploaded and stored on a cloud-based computer.

Figure 4:
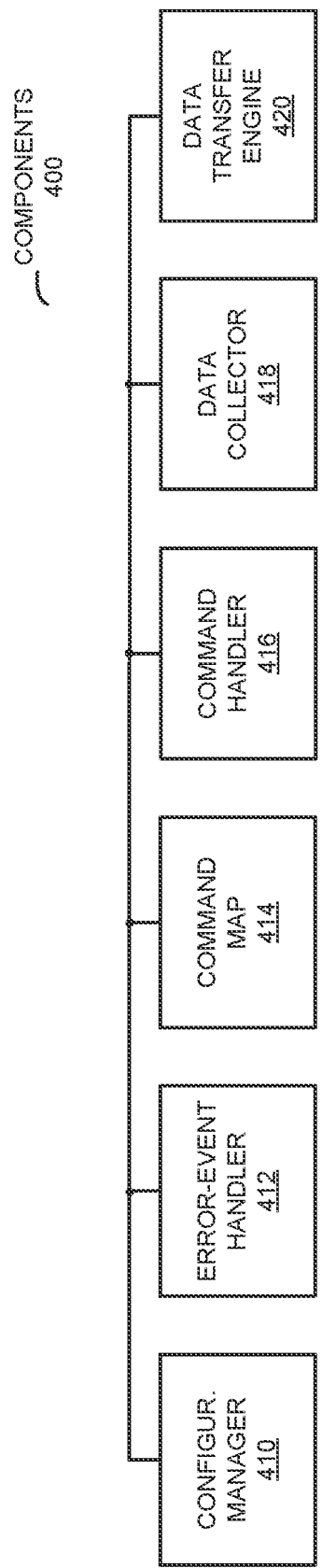
FIG. 4 is a drawing illustrating an example of components used to perform error-event capture in accordance with an embodiment of the present disclosure.

FIG. 4 presents a drawing illustrating an example of components 400 used to perform error-event capture. These components may include a configuration manager 410 that performs registration and configuration, such as command configuration and registration of modules or components that are monitored. For example, a new module that is added and that is monitored during the monitoring techniques may be registered and added to data structures that are associated with the monitoring techniques. The data structures may include possible error events or types of error events for a particular module, as well as a set of commands (and their associated arguments) that are performed when an error event occurs for this module.

Figure 5:
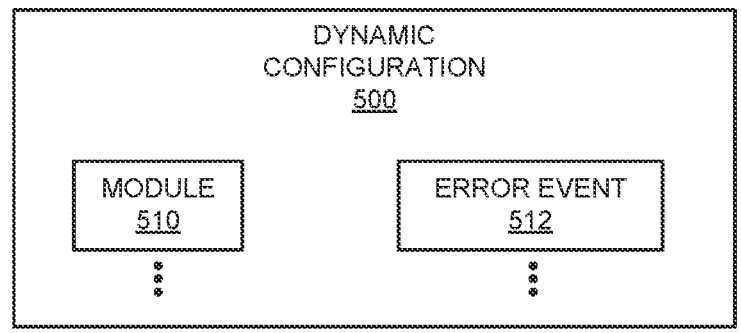
FIG. 5 is a drawing illustrating an example of a dynamic configuration associated with a module in accordance with an embodiment of the present disclosure.

FIG. 5 presents a drawing illustrating an example of a dynamic configuration 500 associated with a module. Notably, this dynamic configuration may include information for at least a module 510, including: a module identifier; a list of one or more commands that are executed when an error event occurs for the module; and/or a list of one or more types of error events for the module. Moreover, dynamic configuration 500 may include information for at least an error event 512, including: an error event identifier; a list of one or more commands that are executed when this error event occurs; and/or a list of one or more data structures where information associated with error event 512 is stored.

Referring back to FIG. 4, components 400 may include an error-event handler 412, which may validate error events and may invoke data collection. Notably, when a module identifies a possible error condition in the module, a capture application programming interface may be used to notify the error-event handler 412 that an error event has occurred. The error-event handler 412 may then: validate the error event (such as it is from a known module, is a known or predefined type of error event, etc.), check if there are any duplicate error events (duplicate error events may be dropped), and invoke data collection.

Note that the capture application programming interface may need to be triggered by a module that has a valid module identifier, a valid error-event identifier, and/or one or more arguments in a list of available arguments for mapped commands. As noted previously, a user may define a possible error event. The error-event handler 412 may match an error string associated with an identified error event with a list of one or more types of error events for the module.

In some embodiments, a list of error events that have occurred may be maintained, and a speed at which the error events occurred may be monitored. When an upper rate threshold is exceeded (such as approximately 25 events per second), the argument match may be disabled. Therefore, when there is such rate limiting, only the module identifier and the error-event identifier may be matched.

Moreover, components 400 may include a command map 414 that maps events to modules and may map commands to error events. For example, a command map data structure may include a mapping between the module and its corresponding error events, the error events and the corresponding commands, the command string and their corresponding argument list, and/or a list of one or more data structures associated with the module. In some embodiments, the command map data structure may include entries for one or more modules (such as a data plane, a control plane, a management plane, an interface circuit, etc.). Each of the modules may have a list of one or more types of error events, one or more generic commands and/or a list of data structures. In addition, for a given type of error event, in the list of one or more types of error events, the error event may map to or correspond to one or more commands, each of which may include a command string and the associated argument(s).

Furthermore, components 400 may include a command handler 416 that substitutes command arguments and performs command parsing. For example, when an error event occurs, the commands that are specific to that error event may be fetched from the command map, and the argument values received from the module, via the application programming interface, may be substituted into each command and sent to a parser for execution.

Figure 6:
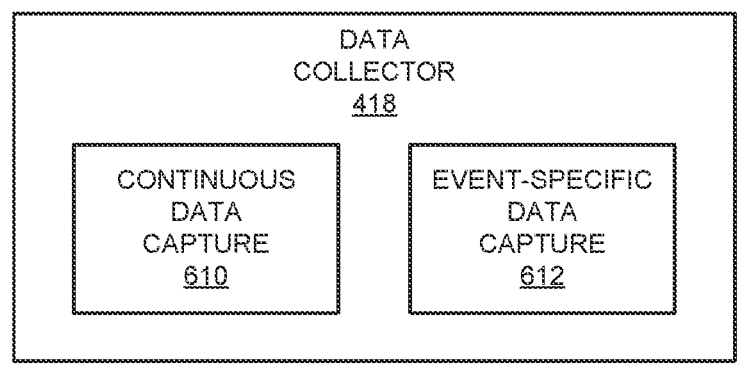
FIG. 6 is a drawing illustrating an example of a data collector in accordance with an embodiment of the present disclosure.

Additionally, as shown in FIG. 6, which presents a drawing illustrating an example of data collection, components 400 may include a data collector 418 that performs continuous data capture 610 and event-specific data capture 612. During the continuous data capture 610, a variety of system-operation information may be collected, including: console logs for different sessions, an attribute associated with the error event (such as critical, error or debug), optional information enabled by a user, system log messages, packet or frame headers, etc. When an error event occurs, the continuous data may be transferred to a debug data structure. Moreover, during the event-specific data capture 612, data that is specific to an error event is collected, including: the commands that are mapped to the error event, and/or user-defined global data structures, user-defined local data structures or both. Note that the commands may be parsed by the parser and an output may be re-directed to the debug data structure. In addition, when the error event occurs, the global and/or local data structures may be dumped to the debug data structure, along with the data structure names, the event identifier and/or timestamp information.

In some embodiments, components 400 may include a data transfer engine 420 that stores data to files and/or performs remote data transfer. For example, if a connection to a cloud-based computer (such as a controller) is available, the debug data structure may be transferred to the cloud-based computer. Alternatively or additionally, the debug data structure may be may be stored in one or more files.

Moreover, in some embodiments, the monitoring techniques are implemented using parent and child tasks. A parent task may be responsible for validating if an error event is a duplicate. It may also send a notification for data collection with the event identifier, the module identifier and required command arguments to the child task. Note that transfer of stored data to a remote computer (such as a cloud-based computer) may be performed by the parent task.

Furthermore, the child task may process the configuration (such as an update to the command map data structure for the modules) and may perform the command mapping for a particular error event. The child task may perform command parsing and data collection.

In a stack of multiple electronic devices (such as multiple instances of an electronic device) or networking devices, the functions performed by the parent task and the child task may be unchanged. If specific data collection needs to be performed by an active electronic device in a stack, those requests may be sent to the active electronic device for data collection. Note that the dynamic configuration may be synchronized to the non-active electronic devices (which are sometimes referred to as 'members' or 'standby electronic devices') via messages from the active electronic device to the other electronic devices (such as inter-process communication). Moreover, displayed information associated with commands from the non-active electronic devices may be fetched via additional messages (such as additional inter-process communication) from the non-active electronic devices by the active electronic device.

Furthermore, each of the electronic devices in the stack may implement a hierarchy of instances of the parent task and the child task. Once again, the active electronic device may disseminate the dynamic configuration to the other electronic devices in the stack, and collected data may be provided by the other electronic devices in the stack to the active electronic device. After data collection on the non-active electronic devices is completed, if a user triggers a remote data transfer to the cloud-based computer, the collected data may be sent to the active electronic device. Thus, the error-event handling on the member and standby electronic devices may be handled independently on every electronic device by separate instances of the dynamic error-handling framework that implements the monitoring techniques.

Note that the monitoring techniques may address problems with other approaches to data collection. Notably, attempts to collect data after an error event occurs may not be reliable. For example, a message to capture data following an error event may not be processed in time because a processor may be busy with another, higher-priority task. In the monitoring techniques, this problem is addressed by continuously capturing data prior to the occurrence of an error event. Similarly, if a link fails, a message to capture data may not be received by modules or subsystems. In the monitoring techniques, this problem is addressed by having the modules or subsystems continuously capture data, which is then selectively persisted and aggregated when an error event occurs.

Moreover, if data is continuously collected from multiple subsystems or modules and archived, then the amount of memory required may be large, and there may not be the ability to quickly identify a root cause of the error event or to avoid the need to retrospectively reproduce the error event. In contrast, in the monitoring techniques, these problems are addressed by subsequent selective persistence of collected data and the association of this stored data with the occurrence of an error event. Notably, based at least in part on known or predefined types of errors (and the interrelationships between cause of error and possible explanations/causes), specific pieces of relevant data from error counters for appropriate modules or subsystems (such as for an interface circuit and/or a packet processor) can be persisted. In some embodiments, the monitoring techniques may collect data when a problem (or error event) is occurring, e.g., in the network. This may involve software keying off the error events to determine which data needs to be persisted. Consequently, in some embodiments, the monitoring techniques may be able to identify and persist data for previously unreported error events or for types of errors in software that do not have any external symptoms in modules or subsystems.

Thus, the monitoring techniques may proactively collect data that is subsequently selectively persisted, which may eliminate a need to retrospectively reproduce an error event, and which may provide the advantages of an event-triggered activity monitor without the problems outlined previously. Moreover, the monitoring techniques may provide a framework for reporting the error event and collecting error-event data. These capabilities may allow the error event to be analyzed (e.g., determining whether the error event occurred at runtime) and corrected. Note that 'runtime' may be defined in this discussion to mean 'as it happens.' This may not be the runtime of software, a program or program instructions. Instead, it may be the runtime of an electronic device or system as it executes operations or commands.

We now describe embodiments of an electronic device, which may perform at least some of the operations in the monitoring techniques. FIG. 7 presents a block diagram illustrating an example of an electronic device 700 in accordance with some embodiments, such as one of electronic device 108, one of access points 110 or one of recipient electronic devices 112. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, one or more graphics process units (GPUs) and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program instructions 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a network node that can be coupled or connected to a network or link, or an antenna node or a pad that can be coupled to the one or more antennas 720. Thus, electronic device 700 may or may not include the one or more antennas 720.) For example, networking subsystem 714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a networking device, a stack of networking devices, an access point, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program instructions 722 are included in operating system 724 and/or control logic 716 is included in interface circuit 718. In some embodiments, the monitoring techniques are implemented using information in layer 2 and/or layer 3 of the OSI model.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714 (or, more generally, of electronic device 700). The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the monitoring techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the monitoring techniques may be implemented using program instructions 722, operating system 724 (such as a driver for interface circuit 718) or in firmware in interface circuit 718. Alternatively or additionally, at least some of the operations in the monitoring techniques may be implemented in a physical layer, such as hardware in interface circuit 718.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the monitoring techniques, different numerical values may be used.

Moreover, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate one or more packets or frames;
a processor, coupled to the interface circuit, configured to process the one or more packets or frames, or contents of the one or more packets or frames; and
memory coupled to the processor, wherein the electronic device is configured to:

communicate, using the interface circuit, the one or more packets or frames;
process, using the processor, the one or more packets or frames, or contents of the one or more packets or frames;
store, in the memory, information associated with operation of the electronic device during the communicating and the processing;
analyze, using an error-event monitor in the electronic device, at least a portion of the stored information during a time interval to detect an occurrence of an error event that comprises a previously unreported type of error event that is different from one or more known types of error events in the electronic device; and
when the error event occurs during the time interval, perform a remedial action and persist, in the memory, at least a second portion of the stored information associated with the error event.

2. The electronic device of claim 1, wherein, when the error event does not occur during the time interval, the electronic device is configured to overwrite, in the memory, the stored information with additional information associated with operation of the electronic device during subsequent communicating and processing.

3. The electronic device of claim 1, wherein the electronic device comprises a router or a switch.

4. The electronic device of claim 1, wherein the stored information comprises one or more of: state information for the interface circuit, state information for the processor, or information associated with the one or more packets or frames.

5. The electronic device of claim 1, wherein, when the error event occurs, the error-event monitor is configured to increment a stored statistic for an associated type of error event.

6. The electronic device of claim 1, wherein, when the error event occurs, the error-event monitor is configured to store timestamp information in the memory.

7. The electronic device of claim 1, wherein the error-event monitor is implemented as error-event program instructions executed by the processor.

8. The electronic device of claim 1, wherein the error-event monitor is implemented using a circuit.

9. The electronic device of claim 1, wherein the remedial action comprises providing, using the interface circuit, a notification message addressed to a computer.

10. The electronic device of claim 9, wherein, in response to the notification, the electronic device is configured to:
receive, using the interface circuit, a request associated with a second computer for the stored information associated with the error event; and
provide, using the interface circuit, the stored information associated with the error event in response to the request.

11. The electronic device of claim 1, wherein the analysis is based at least in part on a speed of occurrence of error events.

12. The electronic device of claim 1, wherein the electronic device is configured to perform a mapping from error events to a module and commands corresponding to the error events; and
wherein the module comprises: a data plane, a control plane, a management plane or the interface circuit.

13. A non-transitory computer-readable storage medium for use in conjunction with an electronic device, the computer-readable storage medium storing program instructions that, when executed by a networking device in the networking devices, causes the networking device to perform operations comprising:
communicating, using an interface circuit in the electronic device, one or more packets or frames;
processing, using a processor in the electronic device, the one or more packets or frames, or contents of the one or more packets or frames;
storing, in memory in the electronic device, information associated with operation of the electronic device during the communicating and the processing;
analyzing, using an error-event monitor in the electronic device, at least a portion of the stored information during a time interval to detect an occurrence of an error event that comprises a previously unreported type of error event that is different from one or more known types of error events in the electronic device; and
when the error event occurs during the time interval, performing a remedial action and persisting, in the memory, at least a second portion of the stored information associated with the error event.

14. The non-transitory computer-readable storage medium of claim 13, wherein, when the error event does not occur during the time interval, the operations comprise overwriting, in the memory, the stored information with additional information associated with operation of the electronic device during subsequent communicating and processing.

15. The non-transitory computer-readable storage medium of claim 13, wherein the electronic device comprises a router or a switch.

16. The non-transitory computer-readable storage medium of claim 13, wherein the stored information comprises one or more of: state information for the interface circuit, state information for the processor, or information associated with the one or more packets or frames.

17. The non-transitory computer-readable storage medium of claim 13, wherein, when the error event occurs, the operations comprise:
incrementing, using the error-event monitor, a stored statistic for an associated type of error event; and
storing, using the error-event monitor, timestamp information in the memory.

18. The non-transitory computer-readable storage medium of claim 13, wherein the error-event monitor is implemented as error-event program instructions executed by the processor.

19. The non-transitory computer-readable storage medium of claim 13, wherein the remedial action comprises providing, using the interface circuit, a notification message addressed to a computer.

20. The non-transitory computer-readable storage medium of claim 19, wherein, in response to the notification, the operations comprise:
receiving, using the interface circuit, a request associated with a second computer for the stored information associated with the error event; and
providing, using the interface circuit, the stored information associated with the error event in response to the request.

21. A method for selectively and automatically capturing error-event information, comprising:
by an electronic device:
communicating, using an interface circuit in the electronic device, one or more packets or frames;

processing, using a processor in the electronic device, the one or more packets or frames, or contents of the one or more packets or frames;

storing, in memory in the electronic device, information associated with operation of the electronic device during the communicating and the processing;

analyzing, using an error-event monitor in the electronic device, at least a portion of the stored information during a time interval to detect an occurrence of an error event that comprises a previously unreported type of error event that is different from one or more known types of error events in the electronic device; and when the error event occurs during the time interval, performing a remedial action and persisting, in the memory, at least a second portion of the stored information associated with the error event.

22. The method of claim 21, wherein, when the error event does not occur during the time interval, the method comprises overwriting, in the memory, the stored information with additional information associated with operation of the electronic device during subsequent communicating and processing.

\* \* \* \* \*